United States Patent
Chung et al.

(10) Patent No.: US 8,421,881 B2
(45) Date of Patent: Apr. 16, 2013

(54) APPARATUS AND METHOD FOR ACQUIRING IMAGE BASED ON EXPERTISE

(75) Inventors: Dae-Su Chung, Seoul (KR); Byung-Ho Kang, Yongin-si (KR)

(73) Assignees: Samsung Electronics Co., Ltd., Suwon-Si (KR); Samsung Electro-Mechanics Co., Ltd., Suwon-Si (KR)

( * ) Notice: Subject to any disclaimer, the term of this patent is extended or adjusted under 35 U.S.C. 154(b) by 476 days.

(21) Appl. No.: 12/318,964

(22) Filed: Jan. 13, 2009

(65) Prior Publication Data
US 2009/0185050 A1   Jul. 23, 2009

(30) Foreign Application Priority Data
Jan. 17, 2008   (KR) .................. 10-2008-0005319

(51) Int. Cl.
*H04N 5/235*   (2006.01)
(52) U.S. Cl.
USPC ........................................... 348/229.1
(58) Field of Classification Search .... 348/222.1–229.1, 348/207.1; 382/224–228; 396/128, 429
See application file for complete search history.

(56) References Cited

U.S. PATENT DOCUMENTS
6,301,440 B1 *  10/2001   Bolle et al. .................. 396/128
7,558,408 B1 *   7/2009   Steinberg et al. ........... 382/118

FOREIGN PATENT DOCUMENTS
JP   2003-344891   12/2003
KR   2002-0008191    1/2002

* cited by examiner

*Primary Examiner* — Chieh M Fan
*Assistant Examiner* — Akshay Trehan
(74) *Attorney, Agent, or Firm* — Staas & Halsey LLP

(57) ABSTRACT

Provided are an apparatus and method for acquiring an image based on expertise, whereby laymen can also acquire a high-definition image like experts. The apparatus includes a storage unit storing representative images representing a plurality of image acquisition environments and storing parameters corresponding to the representative images, an image classification unit classifying an input image and selecting a representative image from the storing unit based on a result of the classification, a parameter extraction unit extracting parameters corresponding to the selected representative image from the storage unit, and a control unit controlling the apparatus according to the extracted parameters.

11 Claims, 4 Drawing Sheets

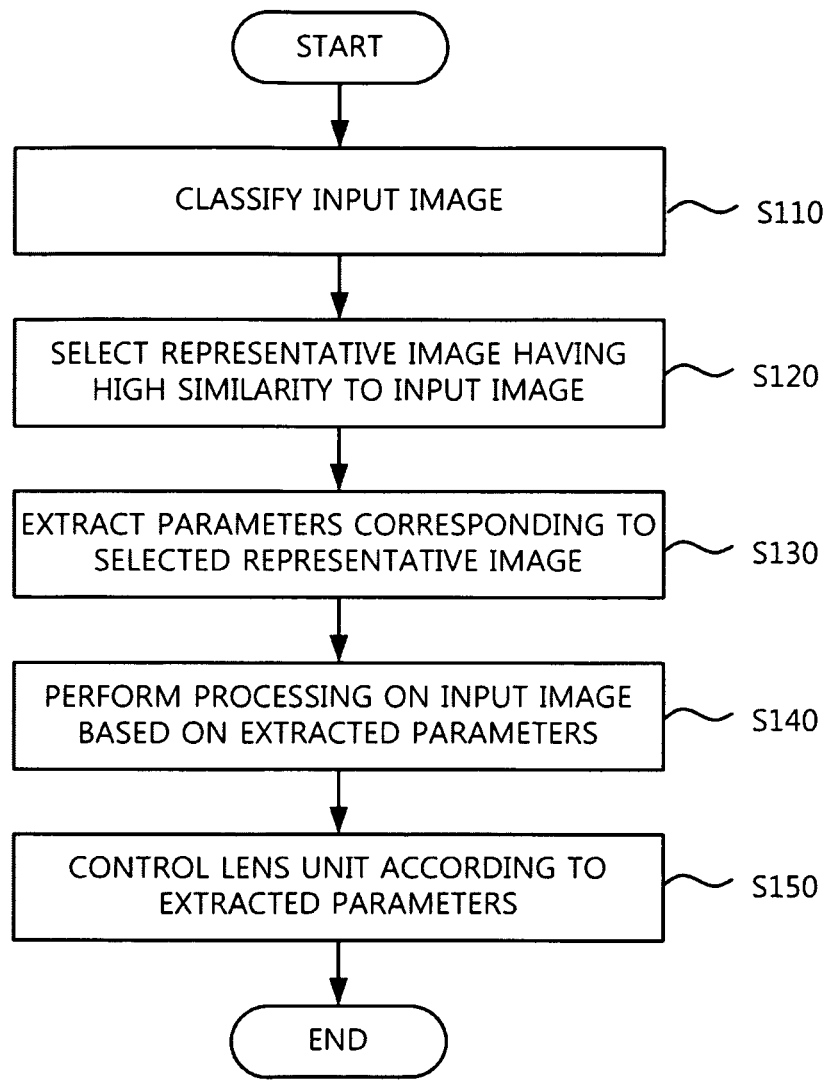

APPARATUS AND METHOD FOR ACQUIRING IMAGE BASED ON EXPERTISE

CROSS-REFERENCE TO RELATED APPLICATION

This application claims priority from Korean Patent Application No. 10-2008-0005319 filed on Jan. 17, 2008 in the Korean Intellectual Property Office, the disclosure of which is incorporated herein by reference in its entirety.

BACKGROUND OF THE INVENTION

1. Field of the Invention

The present invention relates to an apparatus and method for acquiring an image based on expert knowledge, i.e., expertise, whereby laymen (non-professional users) can also acquire a high-definition image like experts.

2. Description of the Related Art

With the common use of cameras such as digital cameras, phone cameras, and digital single lens reflex (DSLR) cameras, laymen are increasingly seeking the ability to acquire the kind of high-definition images that can be acquired by experts.

Although a large number of beginners in image acquisition greatly desire to acquire high-definition images requiring quite a high skill, statistically, 90% or more of beginners have difficulties in acquiring high-definition images due to lack of knowledge owned by experts and need advice or help.

Laymen's difficulties in high-definition image acquisition are mainly caused by lack of ability to concretely analyze or classify their surroundings in image acquisition. In order for laymen to acquire high-definition images, they have to be fully aware of a camera setting method for each image acquisition environment in advance, which increases inconvenience.

Moreover, even experts use different camera setting methods in the same image acquisition environment and thus deciding on an optimal setting method is not easy to users.

Therefore, there is a need for a method to allow users to acquire the optimal image in various image acquisition environments and for various subject types.

SUMMARY OF THE INVENTION

The present invention provides an apparatus and method for acquiring an image based on expert knowledge, i.e., expertise, whereby the apparatus is set according to an input image in order to enable laymen (non-professional users) to acquire a high-definition image like experts.

The above and other objects of the present invention will be described in or be apparent from the following description of the preferred embodiments.

According to an aspect of the present invention, there is provided an apparatus for acquiring an image based on expertise, the apparatus including a storage unit storing representative images representing a plurality of image acquisition environments and storing parameters corresponding to the representative images, an image classification unit classifying an input image and selecting a representative image from the storing unit based on a result of the classification, a parameter extraction unit extracting parameters corresponding to the selected representative image from the storage unit, and a control unit controlling the apparatus according to the extracted parameters.

According to another aspect of the present invention, there is provided a method of acquiring an image based on expertise, the method including storing representative images representing a plurality of image acquisition environments and storing parameters corresponding to the representative images, classifying an input image and selecting a representative image among a plurality of representative images based on a result of the classification, extracting parameters corresponding to the selected representative image from the plurality of parameters, and controlling an apparatus for acquiring an image according to the extracted parameters.

BRIEF DESCRIPTION OF THE DRAWINGS

The above and other features and advantages of the present invention will become more apparent by describing in detail preferred embodiments thereof with reference to the attached drawings in which:

FIG. 4 is a flowchart illustrating a method of acquiring an image based on expertise according to an embodiment of the present invention.

DETAILED DESCRIPTION OF THE INVENTION

Figure 1:
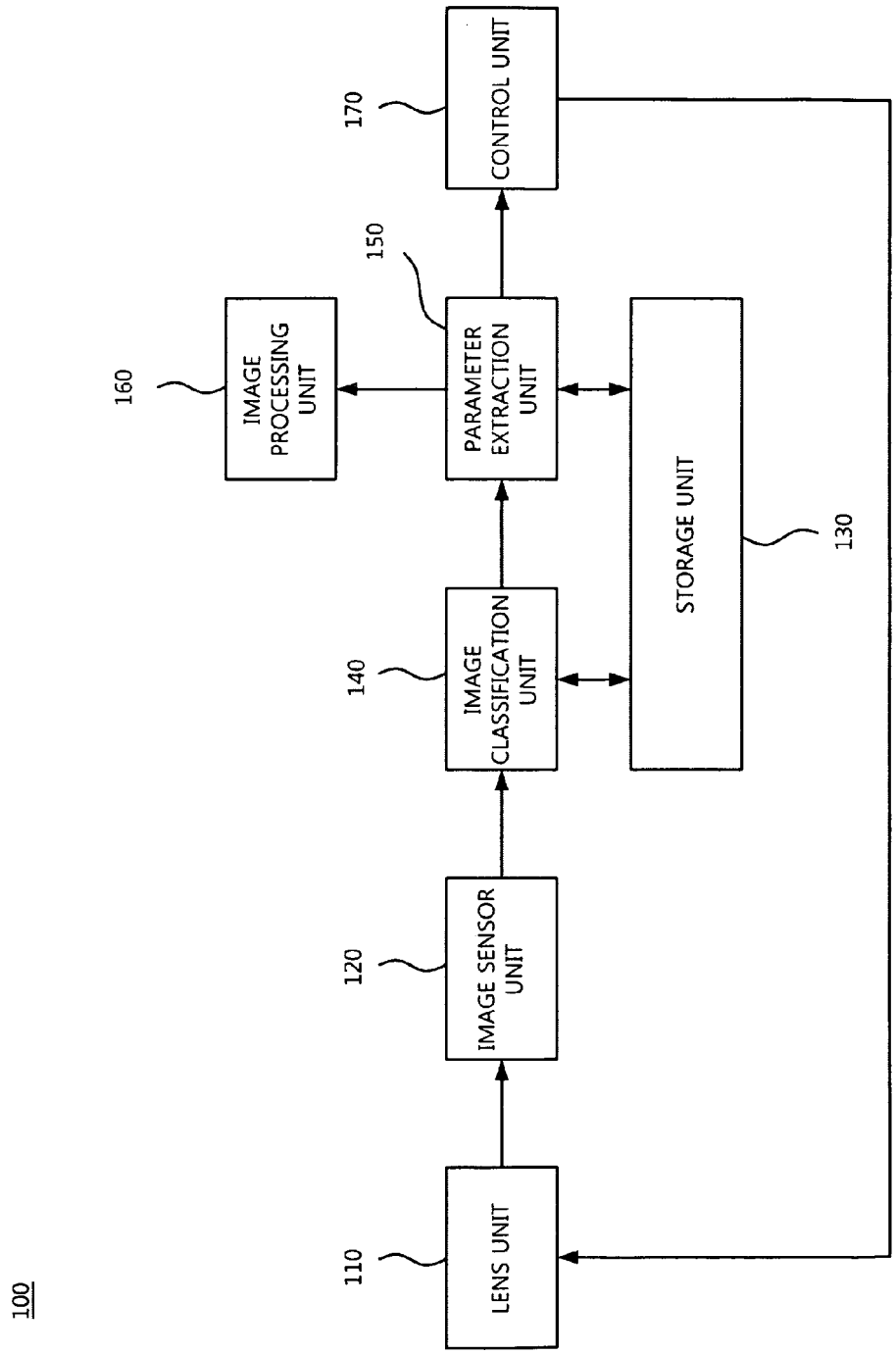
FIG. 1 is a block diagram of an apparatus for acquiring an image based on expertise according to an embodiment of the present invention.

The various aspects and features of the present invention and methods of accomplishing the same may be understood more readily by reference to the following detailed description of exemplary preferred embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

The present invention will hereinafter be described in detail with reference to the accompanying drawings.

An Apparatus and method for acquiring image based on expertise according to an embodiment of the present invention are described hereinafter with reference to the block diagrams and flowchart illustrations. It will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram of an apparatus for acquiring an image based on expertise according to an embodiment of the present invention.

As illustrated in FIG. 1, an apparatus 100 for acquiring an image based on expertise according to an embodiment of the present invention (hereinafter, referred to as an "image acquisition apparatus") may include a lens unit 110, an image sensor unit 120, a storage unit 130, an image classification unit 140, a parameter extraction unit 150, an image processing unit 160, and a control unit 170.

Figure 2:
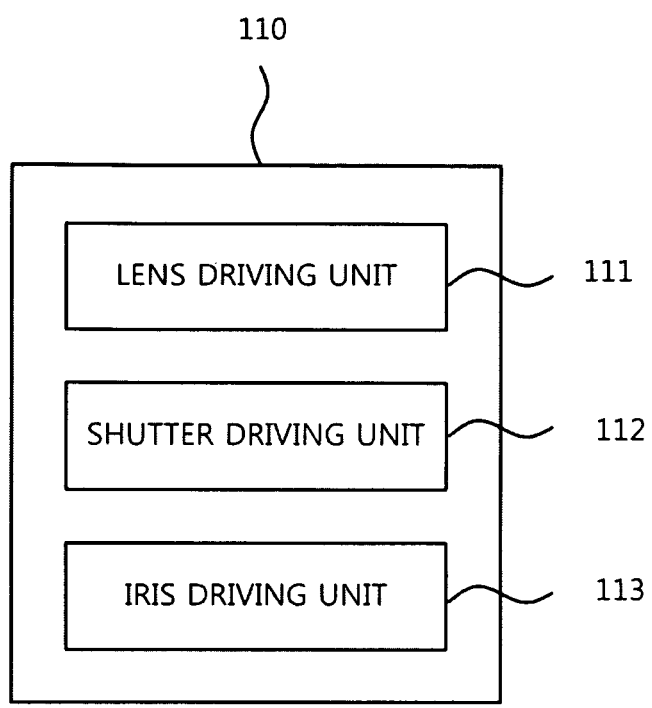
FIG. 2 is a block diagram of a lens unit according to an embodiment of the present invention.

The lens unit 110 optically converges a light signal and may include a lens driving unit 111 for adjusting a lens position, a shutter driving unit 112 for adjusting a shutter speed, and an iris driving unit 113 for adjusting the amount of converged light as illustrated in FIG. 2. The image sensor unit 120 converts the light signal converged by the lens unit 110 into an electric signal.

The storage unit 130 may include a plurality of representative images capable of representing corresponding environments from among various image acquisition environments. For example, the storage unit 130 may store representative images capable of representing an image acquired during the day, an image acquired at night, and an image acquired under bright illumination. For those representative images, the images themselves may be stored or feature points of the images may be stored. The storage unit 130 may store parameters for setting the image acquisition apparatus 100, e.g., 3A parameters of an auto exposure (AE) parameter, an auto focus (AF) parameter, and an auto white balance (AWB) parameter, i.e., a shutter speed, a lens aperture, focus lens control, or gain control, and parameters for a process routine of the image processing unit 160 to be described later, e.g., color correction, noise reduction, and edge enhancement, in such a way that these parameters correspond to each representative image.

Since the expertise-based representative images and parameters are pre-stored, beginners having difficulties in image acquisition in an environment requiring quite a high skill are allowed to acquire an image in various environments by using the pre-stored, expertise-based representative images and parameters without a need for separate manipulation.

The storage unit 130 may be integrated formed with the image acquisition apparatus 100 or may be independently formed of the image acquisition apparatus 100, and the storage unit 130 may be connected to the image acquisition apparatus 100 via a wireless or wired interface irrespective of a model of the image acquisition apparatus 100. Accordingly, the storage unit 130 may not be restricted to the model of the image acquisition apparatus 100.

The image classification unit 140 classifies an image input to the image acquisition apparatus 100 according to an embodiment of the present invention (hereinafter, referred to as an "input image") according to an acquisition environment, and in the current embodiment of the present invention, the image classification unit 140 classifies the input image according to luminance. In the current embodiment of the present invention, the input image may be understood as an image input for preview in a digital camera. The classification of the input image according to luminance is only an example for facilitating understanding of the present invention, and the image classification unit 140 may also classify the input image according to various criteria such as color and chrominance without being limited to luminance.

The image classification unit 140 classifies the input image in order to determine a representative example having the highest similarity to the input image by comparing with the input image representative examples which are capable of representing images acquired in various image acquisition environments and are stored in the storage unit 130. When the representative image having the highest similarity to the input image is found in the storage unit 120, the parameter extraction unit 150 can extract parameters corresponding to the found representative image.

Figure 3:
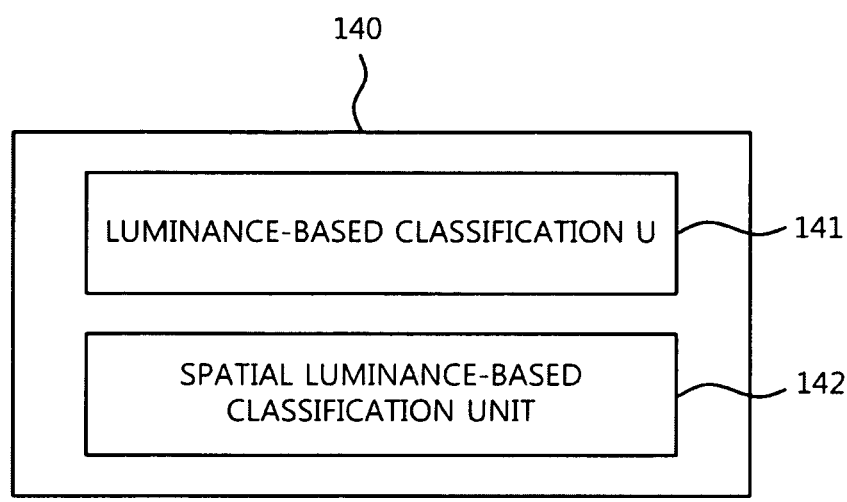
FIG. 3 is a block diagram of an image classification unit according to an embodiment of the present invention.

The image classification unit 140 may include a luminance-based classification unit 141 and a spatial luminance-based classification unit 142 as illustrated in FIG. 3. The luminance-based classification unit 141 calculates a reference value (hereinafter, referred to as an "Lv") based on metadata, e.g., an Exif value, provided by the image acquisition apparatus 100 when the image acquisition apparatus 100 acquires the input image, compares the Lv of the input image with the Lv of each representative image in order to count the number of representative images whose Lvs are greater than the Lv of the input image and the number of images whose Lvs are less than the Lv of the input image, calculates a first probability and a second probability by dividing the counted number of representative images by the total number of representative images, and calculates a probability of the input image being or not being a night view image based on a difference between the first probability and the second probability. The first probability and the second probability can be calculated using Equation (1) expressed as follows:

First probability=$Cnt(Lv$ of each representative image$\geq Lv$ of input image)/total number of representative images Second probability=$Cnt(Lv$ of each representative image$\leq Lv$ of input image)/total number of representative images (1)

where Cnt indicates a count function. For example, in Equation 1, the first probability is a probability of the input image being a night view image, the second probability is a probability of the input image not being a night view image, and the input image is likely to be a night view image in the case of "first probability−second probability>0".

The spatial luminance-based classification unit 142 divides the input image into m*n windows and calculates an average luminance strength for each window. Although the input image is divided into m*n windows for calculation of the average luminance strength in the current embodiment of the present invention, the average luminance strength may also be calculated for each pixel without being limited to each of the m*n windows. The average luminance strength is calculated on a relatively uniform color space like an Ohta color space and a local distribution accumulative probability can be calculated based on the average luminance strength. More specifically, the spatial luminance-based classification unit 142 divides an accumulative probability distribution into L levels, calculates a probability of the input image being a night view image and a probability of the input image not being a night view image in each of the L levels, and determines that there is a high probability of the input image having been acquired at night if a difference between the probabilities is greater than 0. At this time, the spatial luminance-based classification unit 142 may calculate the probability of the input image being a night view image by using a method similar to Equation 1. However, the spatial luminance-based classification unit 142 uses the local distribution accumulative probability of each representative image instead of the Lv of each representative image.

The image classification unit 140 determines whether the input image is a night view image based on at least one of the probabilities calculated by the luminance-based classification unit 141 and the spatial luminance-based classification unit 142, and selects a representative image having an accumulative distribution probability that is least different from the accumulative distribution probability of the input image from among a plurality of representative images stored in the storage unit 130 based on the determination result. For example, the image classification unit 140 may use only the probabilities calculated by the luminance-based classification unit 141 if the Lv of the input image is greater than a predetermined value, and the image classification unit 140 may use both the probabilities calculated by the luminance-based classification unit 141 and the probabilities calculated by the spatial luminance-based classification unit 142 if the Lv of the input image is less than the predetermined value.

The representative image selected by the image classification unit 140 may be understood as having a highest similarity to the input image. Although the image classification unit 140 uses a difference between accumulative distribution probabilities in order to select the representative image having a highest similarity to the input image in the current embodiment of the present invention, the use of the difference is only an example and the present invention is not limited thereto.

The parameter extraction unit 150 may extract parameters corresponding to the representative image selected by the image classification unit 140. The parameters may have been stored in the storage unit 130 together with the corresponding representative image. As mentioned previously, the parameters may include 3A parameters of an AE parameter, an AF parameter, and an AWB parameter, i.e., a shutter speed, a lens aperture, focus lens control, gain control, and parameters for a process routine of the image processing unit 160, e.g., color correction, noise reduction, and edge enhancement.

The image processing unit 160 performs processing, such as color correction, noise reduction, and edge enhancement, on the input image based on the parameters extracted by the parameter extraction unit 150, and a resultant image obtained by processing of the image processing unit 160 may be displayed for the user to view or may be stored in a predetermined storage medium.

The control unit 170 performs optimal setting for image acquisition by controlling each of the lens driving unit 111, the shutter driving unit 112, and the iris driving unit 113 of the lens unit 110 based on the parameters extracted by the parameter extraction unit 150. Thus, a user can acquire an image based on the setting by an expert without knowledge of optimal image acquisition in an image acquisition environment.

FIG. 4 is a flowchart illustrating a method of acquiring an image based on expertise according to an embodiment of the present invention.

As illustrated in FIG. 4, in a method of acquiring an image based on expertise according to an embodiment of the present invention, the image classification unit 140 classifies an image input to the image acquisition apparatus 100 in operation S110. For example, the image classification unit 140 may calculate a probability of the input image being a night view image and a probability of the input image not being a night view image by means of the luminance-based classification unit 141 and the spatial luminance-based classification unit 142 and classify the input image based on a difference between the probabilities.

The image classification unit 140 selects an image having a highest similarity to the input image from the storage unit 130 based on the classification result in operation S120. In the current embodiment of the present invention, the image classification unit 140 may select a representative example having an accumulative distribution probability that is least different from the accumulative distribution probability of the input image.

The parameter extraction unit 150 extracts parameters corresponding to the representative image selected by the image classification unit 140 in operation S130. The parameters may have been stored in the storage unit 130 together with the corresponding representative image.

The image processing unit 160 performs processing, such as color correction, noise reduction, and edge enhancement, on the input image based on the parameters extracted by the parameter extraction unit 150 in operation S140.

The control unit 170 controls the lens unit 110 based on the parameters extracted by the parameter extraction unit 150 in operation S150.

By using the method of acquiring an image based on expertise according to the embodiment of the present invention, a user can acquire the best image that can be acquired by an expert without prior knowledge of an optimal setting method for the image acquisition apparatus 100 in an image acquisition environment. Moreover, since the storage unit 130 for storing representative images and parameters is provided separately, there is no restriction to a model of the image acquisition apparatus 100.

As described above, according to the apparatus and method for acquiring an image based on expertise of the present invention, laymen can acquire a high-definition image even without expert knowledge of an optimal setting method for image acquisition.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. An apparatus for acquiring an image based on expertise, the apparatus comprising:
 a storage unit to store expertise-based representative images representing a plurality of image acquisition environments and to store parameters corresponding to the expertise-based representative images,
 wherein the expertise-based representative images are stored in the storage unit prior to image acquisition;
 an image classification unit to classify an input image based on a difference between a first probability of the input image being a night view image and a second probability of the input image not being the night view image, and to select an expertise-based representative image from the storage unit based on a result of the classification;

a parameter extraction unit to extract parameters corresponding to the selected expertise-based representative image from the storage unit; and a control unit to control the apparatus according to the extracted parameters, wherein the selecting comprises comparing the input image with the stored expertise-based representative images, and selecting a respective expertise-based representative image having the highest similarity to the input image, wherein the image classification unit comprises a luminance-based classification unit classifying the input image based on luminance and a spatial luminance-based classification unit classifying the input image based on local distribution probability.

2. The apparatus of claim 1, wherein the image classification unit selects an expertise-based representative image having an accumulative distribution probability that is least different from an accumulative distribution probability of the input image.

3. The apparatus of claim 1, wherein the control unit controls at least one of a shutter speed, a lens aperture, focus lens control, and gain control according to the extracted parameters.

4. The apparatus of claim 1, further comprising an image processing unit to perform at least one of color correction, noise reduction, and edge enhancement on the input image according to the extracted parameters.

5. The apparatus of claim 1, wherein the spatial luminance-based classification unit divides the input image into plural windows and calculates an average luminance strength for each window.

6. The apparatus of claim 1, wherein the image classification unit determines whether the input image is the night view image based on at least one of the probabilities calculated by the luminance-based classification unit and the spatial luminance-based classification unit.

7. A method of acquiring an image based on expertise, the method comprising:

storing expertise-based representative images representing a plurality of image acquisition environments and storing parameters corresponding to the expertise-based representative images, wherein the expertise-based representative images are stored in the storage unit prior to image acquisition;

classifying an input image based on a difference between a first probability of the input image being a night view image and a second probability of the input image not being the night view image, and selecting an expertise-based representative image among a plurality of representative images based on a result of the classification;

extracting parameters corresponding to the selected expertise-based representative image from the plurality of parameters; and controlling an apparatus for acquiring an image according to the extracted parameters, wherein the selecting comprises comparing the input image with the stored expertise-based representative images, and selecting a respective expertise-based representative image having the highest similarity to the input image, wherein the classifying of the input image comprises classifying the input image based on luminance and classifying the input image based on local distribution probability.

8. The method of claim 7, wherein the classifying of the input image comprises among a plurality of expertise-based representative images, selecting an expertise-based representative image having an accumulative distribution probability that is least different from an accumulative distribution probability of the input image.

9. The method of claim 7, wherein the controlling of the apparatus comprises controlling at least one of a shutter speed, a lens aperture, focus lens control, and gain control according to the extracted parameters.

10. The method of claim 7, further comprising performing at least one of color correction, noise reduction, and edge enhancement on the input image according to the extracted parameters.

11. An apparatus for acquiring an image based on expertise, the apparatus comprising:

a storage unit to store, prior to image acquisition, expertise-based representative images representing a plurality of image acquisition environments;

an image classification unit to compare an input image with the stored expertise-based representative images, to classify the input image based on a difference between a first probability of the input image being a night view image and a second probability of the input image not being the night view image, and to select a respective expertise-based representative image having highest similarity to the input image;

a parameter extraction unit to extract parameters corresponding to the selected expertise-based representative image; and a control unit to control the apparatus according to the extracted parameters, wherein the image classification unit comprises a luminance-based classification unit classifying the input image based on luminance and a spatial luminance-based classification unit classifying the input image based on local distribution probability.

* * * * *